(12) United States Patent
Jeon

(10) Patent No.: US 6,616,574 B2
(45) Date of Patent: Sep. 9, 2003

(54) METHOD AND SYSTEM FOR SHIFT CONTROL OF AUTOMATIC TRANSMISSION

(75) Inventor: Byeong-Wook Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/985,437

(22) Filed: Nov. 2, 2001

(65) Prior Publication Data

US 2002/0068661 A1 Jun. 6, 2002

(30) Foreign Application Priority Data

Dec. 6, 2000 (KR) ........................................ 2000-73881
Jun. 12, 2001 (KR) ........................................ 2001-32739

(51) Int. Cl.$^7$ .............................................. B60K 41/04
(52) U.S. Cl. ...................................................... 477/109
(58) Field of Search .......................... 477/109, 98, 904, 477/54, 61

(56) References Cited

U.S. PATENT DOCUMENTS 5,433,676 A * 7/1995 Abe et al. .................... 477/109
5,577,979 A * 11/1996 Iizuka ......................... 477/109
5,820,516 A * 10/1998 Sasaki et al. ................ 477/109
6,098,003 A * 8/2000 Kozaki et al. ................. 701/51

* cited by examiner

Primary Examiner—Charles A Marmor
Assistant Examiner—Dennis Abdelnour
(74) Attorney, Agent, or Firm—Birch, Stewart, Kolasch & Birch, LLP

(57) ABSTRACT

A system for shift control of an automatic transmission having a vehicle running status detecting part; a shift control part for outputting a control signal to perform a kick down skip 3-1 shift if conditions for the kick down skip 3-1 shift are satisfied with a tip-in manipulation during the 4-3 shift before stop by receiving an input of a signal detected by the vehicle running status detecting part, and for outputting an engine torque reduction requesting signal on the basis of the engine torque reduction starting point and engine torque reduction maintaining time determined according to a vehicle deceleration rate of the 4-3 shift before stop at the time of the kick down skip 3-1 shift, thereby relieving the shift shock at the time of the kick down skip shift generated by re-acceleration during a sudden stop of a vehicle.

7 Claims, 4 Drawing Sheets

METHOD AND SYSTEM FOR SHIFT CONTROL OF AUTOMATIC TRANSMISSION

BACKGROUND OF THE INVENTION

1. Field of the Invention

The present invention relates to a method and a system for shift control of an automatic transmission and more particularly to a method and a system for shift control of an automatic transmission to relieve shift shock by reducing engine torque at the time of a kick down skip shift.

2. Description of the Invention

In general, an automatic transmission selects a shift pattern to optimize shift in relation to a running state of an auto vehicle and operates various solenoid valves according to the shift pattern to change the combination of planetary gears, thus achieving a desired shift. In the course of the shift, shift shock is generated by a change in the combination of planetary gears causing a change in the torque of an output axis.

Accordingly, in order to relieve the aforementioned shift shock, there have been used methods to reduce engine torque at the time of a shift. For instance, at the time of a kick down skip shift, the shift shock is relieved by starting to reduce engine torque when the rotation number of a turbine reaches its preset value and stopping to reduce engine torque when a preset period of time lapses.

When a driver steps on a brake pedal and makes a sudden stop of a vehicle running at a fourth speed stage to achieve a 4-3 shift (a shift from stage 4 to stage 3) (hereinafter referred to as the 4-3 shift before stop), conditions for a kick down skip 3-1 shift are satisfied with a tip-in manipulation of stepping on an accelerating pedal to accelerate the vehicle. As a result, the kick down skip 3-1 shift is completed right after the 4-3 shift. At this time, the 3-1 shift is achieved right after the 4-3 shift before stop by reducing engine torque on the basis of the same engine torque reduction starting point and engine torque reduction maintaining time as those for the kick down skip 3-1 shift during a normal running state of the vehicle. However, there is a problem of significantly bringing about shift shock in the conventional engine torque reduction method because the reduction of engine torque cannot be made at an adequate point of time.

SUMMARY OF THE INVENTION

It is an object of the present invention to solve the aforementioned problems and provide a method and a system for shift control of an automatic transmission, the apparatus which can relieve shift shock of a kick down skip shift generated by re-acceleration during a sudden stop of a vehicle by determining an engine torque reduction starting point and an engine torque reduction maintaining time on the basis of a vehicle deceleration rate at the time of the 4-3 shift before stop when the kick down skip 3-1 shift is made after the 4-3 shift before stop has been completed by getting the kick down skip 3-1 shift to be satisfied by the tip-in manipulation during the 4-3 shift before stop; and by reducing engine torque on the basis of the determined engine torque reduction starting point and engine torque reduction maintaining time.

In order to accomplish the aforementioned object of the present invention, there is provided a system for shift control of an automatic transmission, the system comprising:

vehicle running status detecting means for detecting the running status of a vehicle;

shift control means for outputting a control signal to perform a kick down skip 3-1 shift if conditions for the kick down skip 3-1 shift are satisfied with a tip-in manipulation during the 4-3 shift before stop by receiving an input of a signal detected by the vehicle running status detecting means, and for outputting an engine torque reduction requesting signal on the basis of an engine torque reduction starting point and an engine torque reduction maintaining time determined according to a vehicle deceleration rate of the 4-3 shift before stop at the time of the kick down skip 3-1 shift;

transmission driving means for carrying out a shift by supplying or stopping the oil pressure discharged and supplied from an oil pump according to a control signal output from the shift control means;

engine control means for outputting a predetermined control signal to reduce engine torque according to an engine torque reduction requesting signal output from the shift control means; and engine driving means for reducing engine torque according to the control signal output from the engine control means.

In addition, there is provided a method for shift control of an automatic transmission in accordance with the present invention, the method comprising the steps of:

discriminating whether conditions for a kick down skip 3-1 shift are satisfied with the tip-in manipulation during the 4-3 shift before stop;

reducing an engine torque, when the conditions for the kick down skip 3-1 shift are satisfied, according to a reduction starting point determined on the basis of the vehicle deceleration rate during the 4-3 shift before stop; and returning an engine torque to its original value if the engine torque reduction maintaining time determined on the basis of the vehicle deceleration rate during the 4-3 shift before stop elapses

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, a preferred embodiment of the present invention will be described in detail with reference to accompanying drawings.

Figure 1:
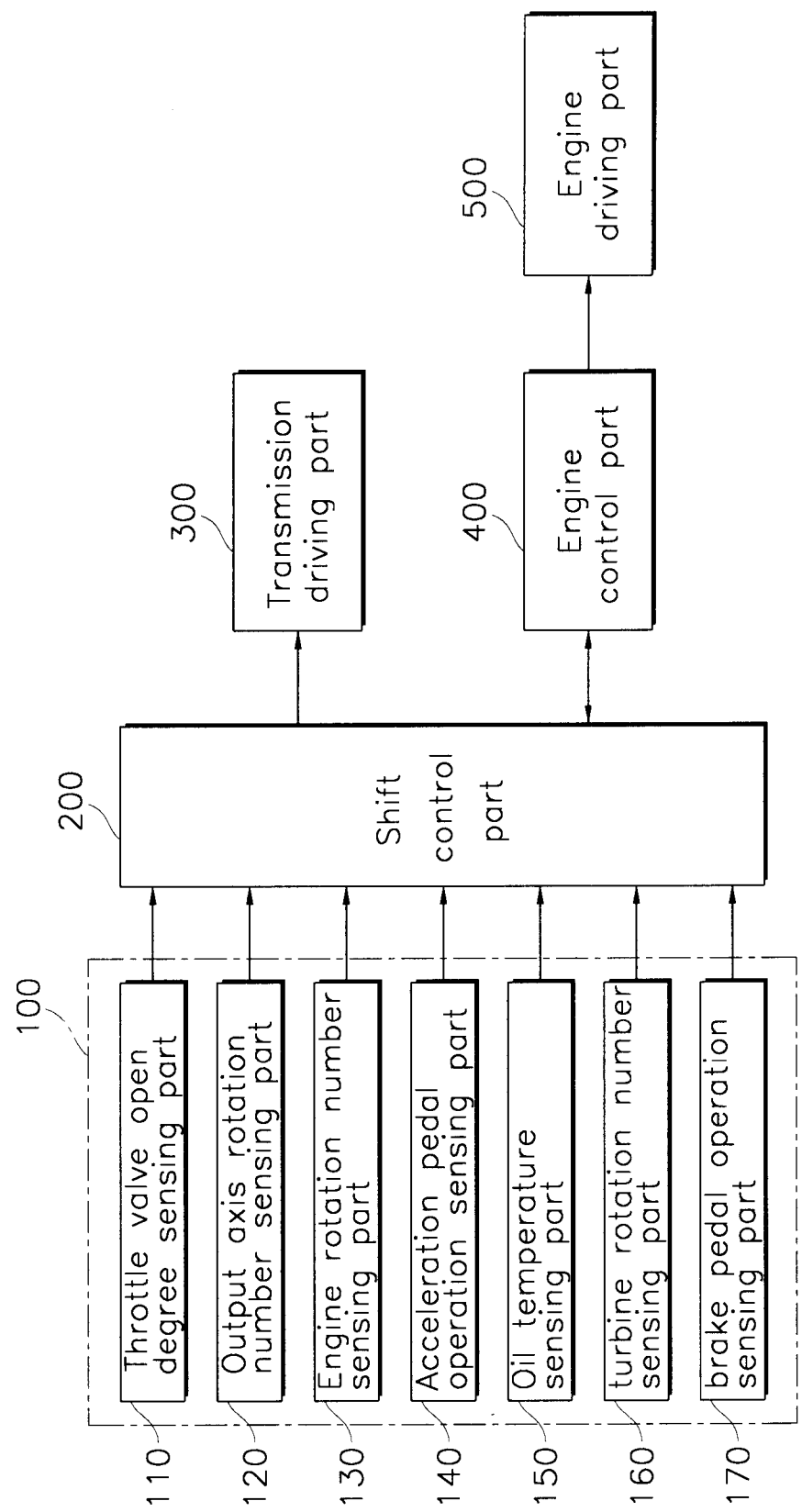
FIG. 1 is a block diagram for illustrating the structure of a system for shift control of an automatic transmission in accordance with the present invention.

FIG. 1 is a block diagram for illustrating the structure of a system for shift control of an automatic transmission in accordance with the present invention, including a vehicle running status detecting part 100, a shift control part 200, a transmission driving part 300, an engine control part 400 and an engine driving part 500.

The vehicle running status detecting part 100 detects and inputs status of a running vehicle to the shift control part 200, including: a throttle valve open degree sensing part 110 for sensing the open degree of a throttle valve sequentially moving to the operational status of an acceleration pedal, an output axis rotation number sensing part 120 for sensing the number of rotations of an output axis of the automatic transmission, an engine rotation number sensing part 130, an acceleration pedal operation sensing part 140 for sensing the operational status of the acceleration pedal, an oil temperature sensing part 150 for sensing the temperature of oil in the automatic transmission, a turbine rotation number sensing part 160 for sensing the rotation number of a turbine and a brake pedal operation sensing part 170 for sensing the operational state of a brake pedal.

The shift control part 200 controls the shift by receiving an input of data including open degree of a throttle valve, rotation number of an output axis, rotation number of an engine, operational state of an accelerating pedal, temperature of oil, rotation number of a turbine, operational state of a brake pedal and the like. When the conditions for a kick down skip 3-1 shift are satisfied with a tip-in manipulation during the 4-3 shift before stop in a vehicle running at a stage 4 (a fourth speed stage), the shift control part 200 outputs a predetermined duty control signal to perform the kick down skip 3-1 shift right after completion of the 4-3 shift before stop and inputs to the engine control part 400 an engine torque reduction requesting signal on the basis of the engine torque reduction starting point and the engine torque reduction maintaining time determined according to a vehicle deceleration rate during the 4-3 shift before stop for the kick down skip 3-1 shift.

The transmission driving part 300 performs a shift by supplying or stopping the oil pressure discharged and supplied from the oil pump as a frictional element by operating various solenoid valves with a predetermined duty control signal output from the shift control part 200.

The engine control part 400 inputs to the engine driving part 500 a predetermined control signal to reduce engine torque according to the engine torque reduction requesting signal input from the shift control part 200. The engine driving part 500 reduces engine torque according to the predetermined control signal input from the engine control part 400.

Operations and effects of the shift control apparatus of an automatic transmission thus constructed and the method therefor will be described in detail with reference to FIGS. 2 through 5.

Figure 2:
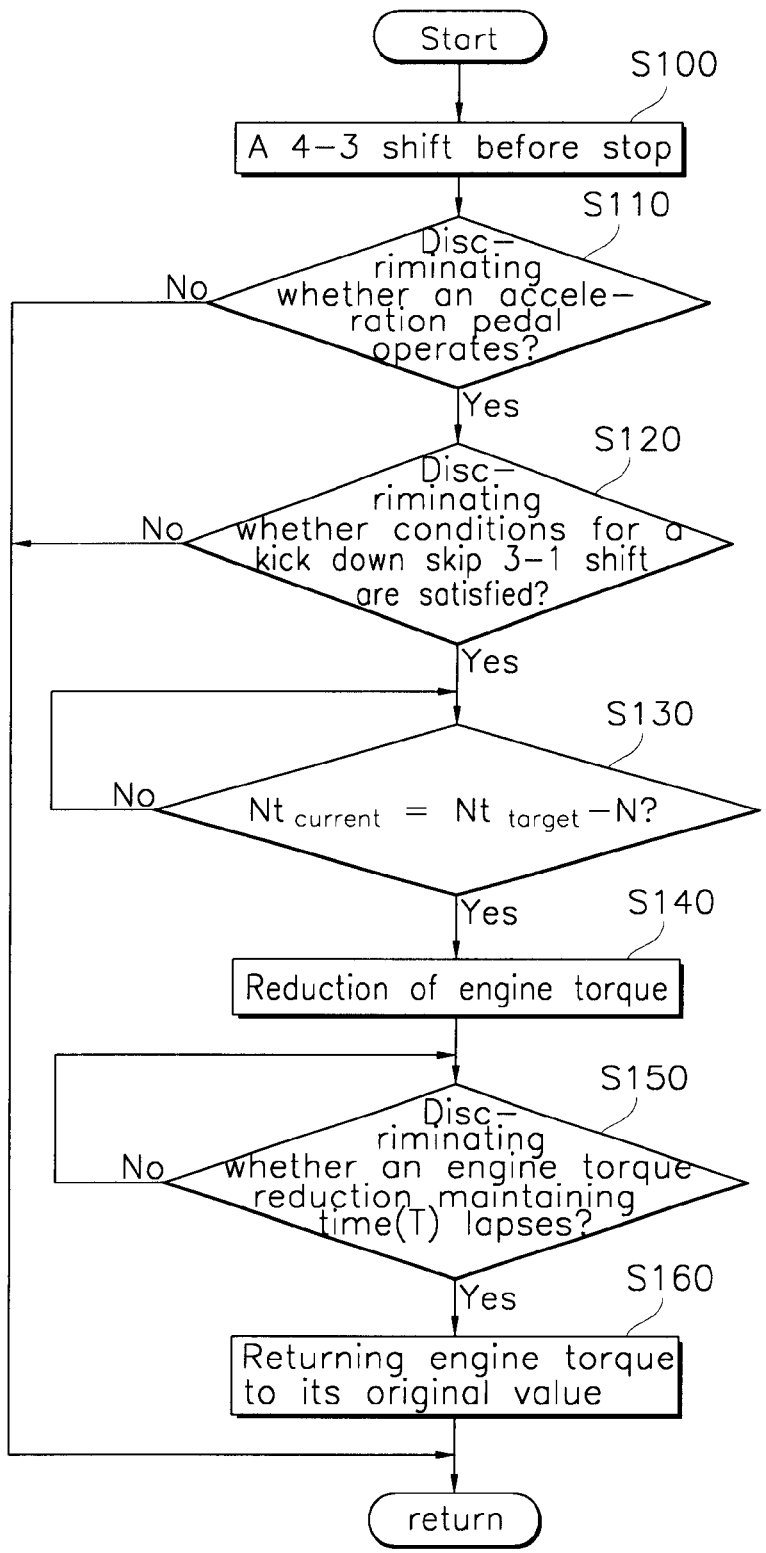
FIG. 2 is a flowchart for illustrating a method for controlling shifts of an automatic transmission in accordance with the present invention.
Figure 3:
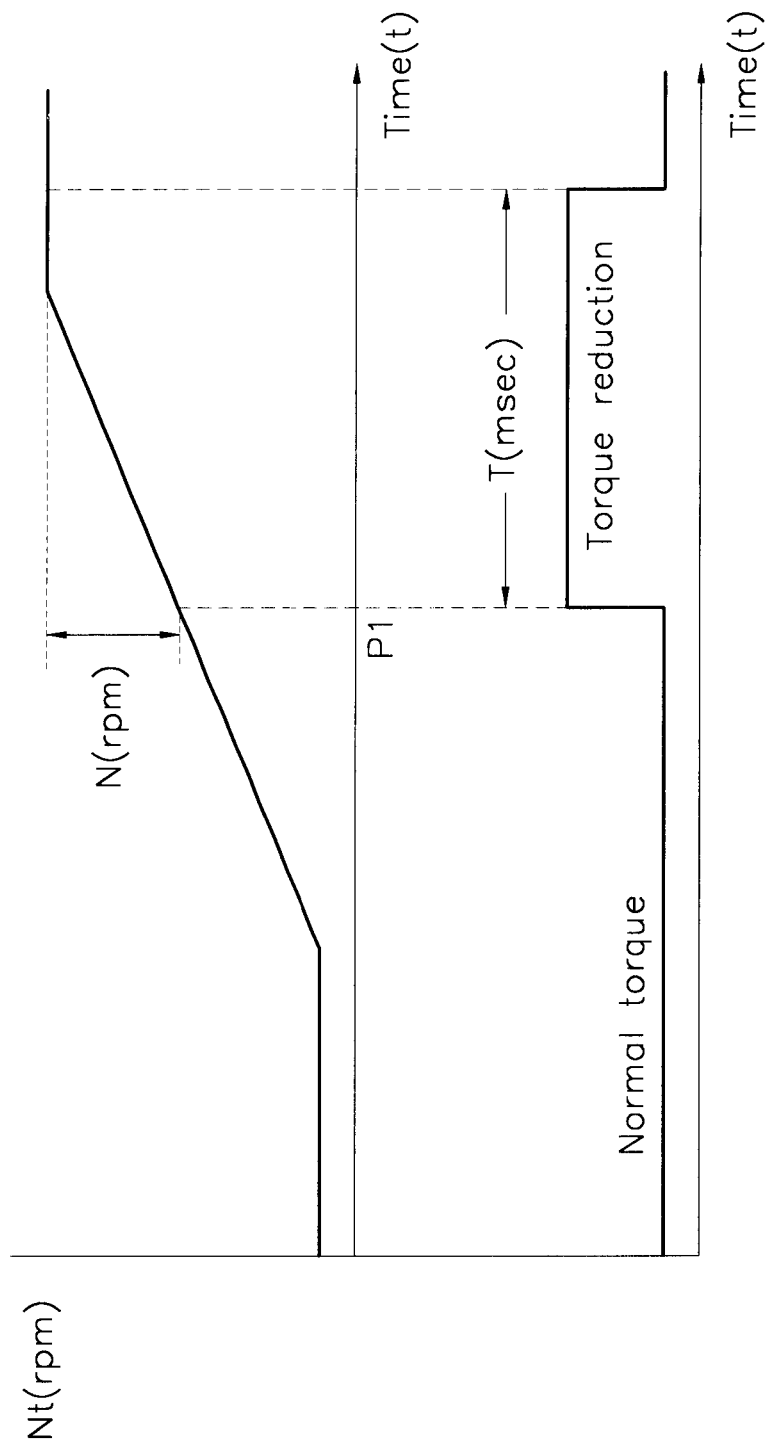
FIG. 3 is a graph for illustrating a method for reducing engine torque in accordance with the present invention.

FIG. 2 is a flowchart for illustrating a shift control method of an automatic transmission in accordance with the present invention. In FIG. 2 each step is designated with S.

As shown in FIG. 2, at the step of S100, if the status of a running vehicle detected by the vehicle running status detecting part 100 meets the conditions for the 4-3 shift to 3 before stop, the shift control part 200 performs the 4-3 shift before stop by operating the transmission driving part 300.

In other words, while a vehicle is running, the vehicle running status detecting part 100 detects and inputs to the shift control part 200 the open degree of a throttle valve, the rotation number of an output axis, the rotation number of an engine, the operational state of an accelerating pedal, the temperature of oil, the rotation number of a turbine, the operational state of a brake pedal. The shift control part 200 sets a shift pattern on the basis of the data sensed and input from the vehicle running status detecting part 100 and performs a shift by operating the transmission driving part 300.

Then, at the step of S110, the shift control part 200 discriminates whether conditions for a tip-in manipulation (for instance, the open degree of a throttle valve is over 80%) are satisfied by a driver's stepping on the acceleration pedal to re-accelerate the vehicle during the 4-3 shift before stop. When the tip-in condition is satisfied, the flow proceeds to the step of S120.

At the step of S120, the shift control part 200 discriminates whether the state of a running vehicle detected by the vehicle running status detecting part 100 satisfies the conditions for the kick down skip 3-1 shift. If so, the shift control part 200 performs the kick down skip 3-1 shift by operating the transmission driving part 300 right after completion of the 4-3 shift before stop.

Next, at the step of S130, the shift control part 200 discriminates whether a vehicle deceleration rate estimated by the vehicle running status detecting part 100 during the 4-3 shift before stop on the basis of the status of the running vehicle reaches the engine torque reduction starting point determined on the basis of the above-described vehicle deceleration rate during the 4-3 shift before stop. If so, the flow advances to the step of S140.

At the step of S140, the shift control part 200 outputs an engine torque reduction requesting signal to the engine control part 400, which outputs a predetermined engine control signal to the engine driving part 500 to reduce engine torque according to the engine torque reduction requesting signal input from the shift control part 200. The engine driving part 500 reduces engine torque by being operated according to the predetermined engine control signal input from the engine control part 400.

Furthermore, at the step of S150, the shift control part 200 determines the engine torque reduction maintaining time on the basis of the vehicle deceleration rate during the 4-3 shift before stop. When the engine torque reduction maintaining time elapses, the flow proceeds to the step of S160.

At the step of S160, the shift control part 200 outputs an engine torque return requesting signal to the engine control part 400, which outputs a predetermined engine control signal to the engine driving part 500 to return engine torque to its original value according to the engine torque return requesting signal input from the shift control part 200. The engine driving part 500 returns engine torque to its original value by being operated according to the predetermined engine control signal input from the engine control part 400.

In other words, the conditions for the kick down skip 3-1 shift are satisfied with the tip-in manipulation where a driver continues to step on the acceleration pedal to re-accelerate the vehicle during the 4-3 shift before stop, which is being made while a driver steps on a brake pedal to make a sudden stop of the vehicle running at a stage 4, the kick down skip 3-1 shift is made right after the 4-3 shift before stop.

At the time of the kick down skip 3-1 shift right after the 4-3 shift before stop described above, as shown in FIG. 3, the engine torque reduction starting point P1, and the engine torque reduction maintaining time T are determined on the basis of the vehicle deceleration rate during the 4-3 shift before stop. The engine torque is reduced on the basis of the engine torque reduction starting point P1 and engine torque reduction maintaining time T determined above.

Figure 4:
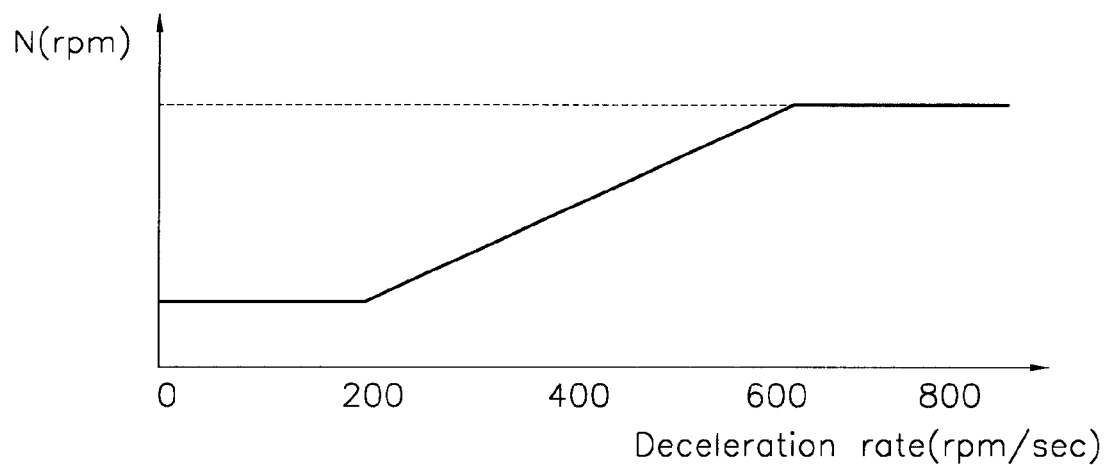
FIG. 4 is a graph for illustrating a method for determining an engine torque reduction starting point in accordance with the present invention.

At this time, the engine torque reduction starting point P1 is determined by using FIG. 4 and the preset map table, where the reference rotation number N corresponding to a vehicle deceleration rate (rpm/sec) during the 4-3 shift before stop is selected and the current rotation number of a turbine ($Nt_{current}$) is determined into a value ($Nt_{target}$-N) by subtracting the reference rotation number (N) out of a target rotation number of a turbine ($Nt_{target}$; the rotation number of a turbine at stage 1). As the reference rotation number (N) is in proportion to the vehicle deceleration rate during the 4-3 shift before stop, an engine torque reduction starting point gets earlier with a greater vehicle deceleration rate.

Figure 5:
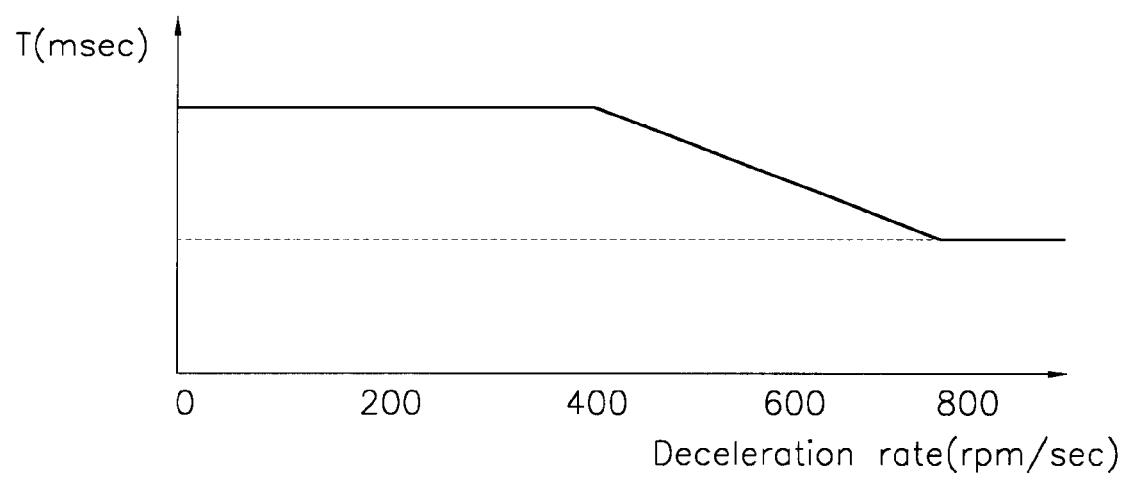
FIG. 5 is a graph for illustrating a method for determining an engine torque reduction maintaining time in accordance with the present invention.

Also, the engine torque reduction maintaining time (T) is determined by using FIG. 5 and the preset map Table, correspondingly to the vehicle deceleration rate (rpm/sec) during the 4-3 shift before stop. As the vehicle deceleration rate gets greater, the engine torque reduction maintaining time (T) gets shorter.

As described above, there is an advantage of relieving the shift shock at the time of the kick down skip shift generated by re-acceleration during a sudden stop of a vehicle in the present invention because the engine torque reduction starting point and engine torque reduction maintaining time are determined on the basis of the vehicle deceleration rate during the 4-3 shift before stop when the kick down skip 3-1 shift right after completion of the 4-3 shift before stop is made by getting the conditions for the kick down skip 3-1 shift to be satisfied with the tip-in manipulation during the 4-3 shift before stop.

What is claimed is:

1. A system for shift control of an automatic transmission, the system comprising:

vehicle running status detecting means for detecting the running status of a vehicle;

shift control means for outputting a control signal to perform a kick down skip 3-1 shift if conditions for the kick down skip 3-1 shift are satisfied with a manipulation during a 4-3 shift before stop by receiving an input of a signal detected by a vehicle running status detecting means, and for outputting an engine torque reduction requesting signal on the basis of an engine torque reduction starting point and engine torque reduction maintaining time determined according to a vehicle deceleration rate of a 4-3 shift before stop at the time of the kick down skip 3-1 shift;

transmission driving means for carrying out a change in speed by supplying or stopping the oil pressure discharged and supplied from an oil pump according to a control signal output from the shift control means;

engine control means for outputting a predetermined control signal to reduce engine torque according to an engine torque reduction requesting signal output from the shift control means; and engine driving means for reducing engine torque according to the control signal output from an engine control means.

2. The system, as defined in claim 1, wherein a vehicle running status detecting means comprises: a throttle valve open degree sensing part for sensing the open degree of a throttle valve sequentially moving to the operational status of an acceleration pedal; an output axis rotation number sensing part for sensing the rotation number of an output axis of the automatic transmission; an engine rotation number sensing part for sensing the rotation number of an engine; an acceleration pedal operation sensing part for sensing the operational state of the acceleration pedal; an oil temperature sensing part for sensing the temperature of the automatic transmission oil; a turbine rotation number sensing part for sensing the rotation number of a turbine and a brake pedal operation sensing part for sensing the operational state of a brake pedal.

3. The system, as defined in claim 1 or 2, wherein the shift control means selects a reference rotation number corresponding to a vehicle deceleration rate during a 4-3 shift before stop by using a preset map table and determines an engine torque reduction starting point with a time when the current rotation number of a turbine reaches a value obtained by subtracting a reference rotation number out of a target rotation number of a turbine.

4. The system, as defined in claim 1 or 2, wherein the shift control means determines an engine torque reduction maintaining time corresponding to a vehicle deceleration rate during a 4-3 shift before stop by using a preset map table.

5. A method for controlling shifts of an automatic transmission, the method comprising the steps of:

discriminating whether conditions for a kick down skip 3-1 shift are satisfied with the manipulation during a 4-3 shift before stop;

reducing an engine torque, when the conditions for the kick down skip 3-1 shift are satisfied, according to an engine torque reduction starting point determined on the basis of a vehicle deceleration rate during a 4-3 shift before stop; and returning an engine torque to its original value if an engine torque reduction maintaining time determined on the basis of a vehicle deceleration rate during a 4-3 shift before stop elapses.

6. The method, as defined in claim 5, wherein a reference rotation number corresponding to a vehicle deceleration rate during a 4-3 before stop is selected by using a preset map table and an engine torque reduction starting point is determined as a time when the current rotation number of a turbine reaches a value obtained by subtracting a reference rotation number out of a target rotation number of a turbine.

7. The method, as defined in claim 5 or 6, wherein an engine torque reduction maintaining time corresponding to a vehicle deceleration rate during a 4-3 shift before stop is determined by using a preset map table.

* * * * *